US012578454B2

(12) United States Patent
Wu et al.

(10) Patent No.: US 12,578,454 B2
(45) Date of Patent: Mar. 17, 2026

(54) EGO VELOCITY ASSISTED DIRECTION OF ARRIVAL ESTIMATOR FOR RADAR SYSTEMS

(71) Applicant: NXP B.V., Eindhoven (NL)

(72) Inventors: Ryan Haoyun Wu, San Jose, CA (US); Jun Li, San Jose, CA (US); Dongyin Ren, East Brunswick, NJ (US)

(73) Assignee: NXP B.V., Eindhoven (NL)

( * ) Notice: Subject to any disclaimer, the term of this patent is extended or adjusted under 35 U.S.C. 154(b) by 280 days.

(21) Appl. No.: 18/349,243

(22) Filed: Jul. 10, 2023

(65) Prior Publication Data

US 2025/0020790 A1     Jan. 16, 2025

(51) Int. Cl.
  G01S 13/60      (2006.01)
  G01S 13/58      (2006.01)

(52) U.S. Cl.
  CPC ............ G01S 13/60 (2013.01); G01S 13/588 (2013.01); G01S 13/589 (2013.01)

(58) Field of Classification Search
  CPC ...... G01S 13/60; G01S 13/588; G01S 13/589; G01S 13/42; G01S 13/931
  See application file for complete search history.

(56) References Cited

U.S. PATENT DOCUMENTS 6,567,034 B1     5/2003  Yu
6,653,973 B2    11/2003  Yu 9,739,881  B1 *   8/2017  Pavek ................... G01S 13/865
10,613,208  B2    4/2020  Ali et al.
2006/0106902  A1    5/2006  Howard et al.
(Continued)

FOREIGN PATENT DOCUMENTS

CN          104459667  A     3/2015
CN          111337873  A     6/2020
(Continued)

OTHER PUBLICATIONS

Xiaohong Li et al., "Joint DOD and DOA Estimation for Bistatic MIMO Radar with Unknown Spatially Colored Noise: A Tensor Completion Approach", 2019 IEEE International Conference on Signal, Information and Data Processing (ICSIDP), Dec. 2019, pp. 1-5.

(Continued)

*Primary Examiner* — William Kelleher
*Assistant Examiner* — Kenneth W Good

(57) ABSTRACT

A radar system includes a processor and a non-transitory computer-readable medium storing machine instructions. The processor obtains an ego velocity Vego of a radar system, a range R of an object in an environment of the radar system, and a radial velocity Vr of the object. The processor determines a simplified two-dimensional (2D) angular search grid and performs a grid-based direction-of-arrival algorithm using the simplified 2D angular search grid. In some implementations, the processor determines a ring of possible positions for a stationary object based on the ego velocity Vego, the range R, and the radial velocity Vr, and includes the ring of possible positions in the simplified 2D angular search grid. In some implementations, the processor determines an arc of possible positions for a moving object based on the range R, and includes the arc of possible positions in the simplified 2D angular search grid.

18 Claims, 7 Drawing Sheets

(56) References Cited

U.S. PATENT DOCUMENTS

| | | | |
|---|---|---|---|
| 2020/0400808 A1 | 12/2020 | Hammes et al. | |
| 2021/0026006 A1* | 1/2021 | Steiner | G01S 13/42 |
| 2022/0187424 A1 | 6/2022 | Abatzoglou et al. | |
| 2022/0214425 A1 | 7/2022 | Yoffe et al. | |
| 2022/0260708 A1 | 8/2022 | Zhang et al. | |
| 2023/0161026 A1* | 5/2023 | Grebner | G01S 15/931 |
| | | | 342/113 |
| 2024/0221186 A1* | 7/2024 | John Wilson | G06T 7/251 |

FOREIGN PATENT DOCUMENTS

| | | |
|---|---|---|
| CN | 111562545 A | 8/2020 |
| CN | 111707985 A | 9/2020 |
| EP | 3757607 A1 | 12/2020 |
| FR | 3087884 A1 | 5/2020 |
| JP | 4131466 B2 | 8/2008 |
| WO | WO-2019185739 A1 | 10/2019 |

OTHER PUBLICATIONS

Cao, Hui et al.; "Accurate DOA Estimation Based on Real-Valued Singular Value Decomposition"; 2019 IEEE International Conference on Signal, Information and Data Processing (ICSIDP); Dec. 11-13, 2019, Chongqing, China; 10.1109/ICSIDP47821.2019.9172819.

Massetani, A. et al.; "Efficient DOA Estimation by a Specific SVD Algorithm"; Proceedings of IEEE International Symposium on Circuits and Systems—ISCAS '94; May 30-Jun. 2, 1994, London, UK; DOI: 10.1109/ISCAS.1994.408985.

Qu, Yi et al.; "SVD-based method for DOA estimation in the presence of mutual coupling"; 2013 IEEE Third International Conference on Information Science and Technology (ICIST); Mar. 23-25, 2013, Yangzhou, China; DOI: 10.1109/ICIST.2013.6747850.

U.S. Appl. No. 18/393,372, "Radar System and Method Therefor," Wu et al., filed Dec. 21, 2023.

Choi, Sungdo et al; "Doppler Coherent Focusing DOA Method for Efficient Radar Map Generation"; IEEE MTT-S Int'l Conf. on Microwaves for Intelligent Mobility; 4 pages (Apr. 15, 2019).

U.S. Appl. No. 18/064,072, "Ego Velocity Estimator for Radar Systems," filed Dec. 9, 2022.

Gönen et al.: "Subspace-based direction-finding Methods" Madisetti, V., Wireless, Networking, Radar, Sensor Array Processing, and Nonlinear Signal Processing (1st edition), CRC Press, 2010, 24 pages.

U.S. Appl. No. 18/393,372 Non-Final Office Action issued on Dec. 3, 2025, 41 pages.

Zhang et al.: "Direction of Departure (DOD) and Direction of Arrival (DOA) Estimation in MIMO Radar with Reduced-Dimension Music," in IEEE Communications Letters, vol. 14, No. 12, pp. 1161-1163, Dec. 2010.

* cited by examiner

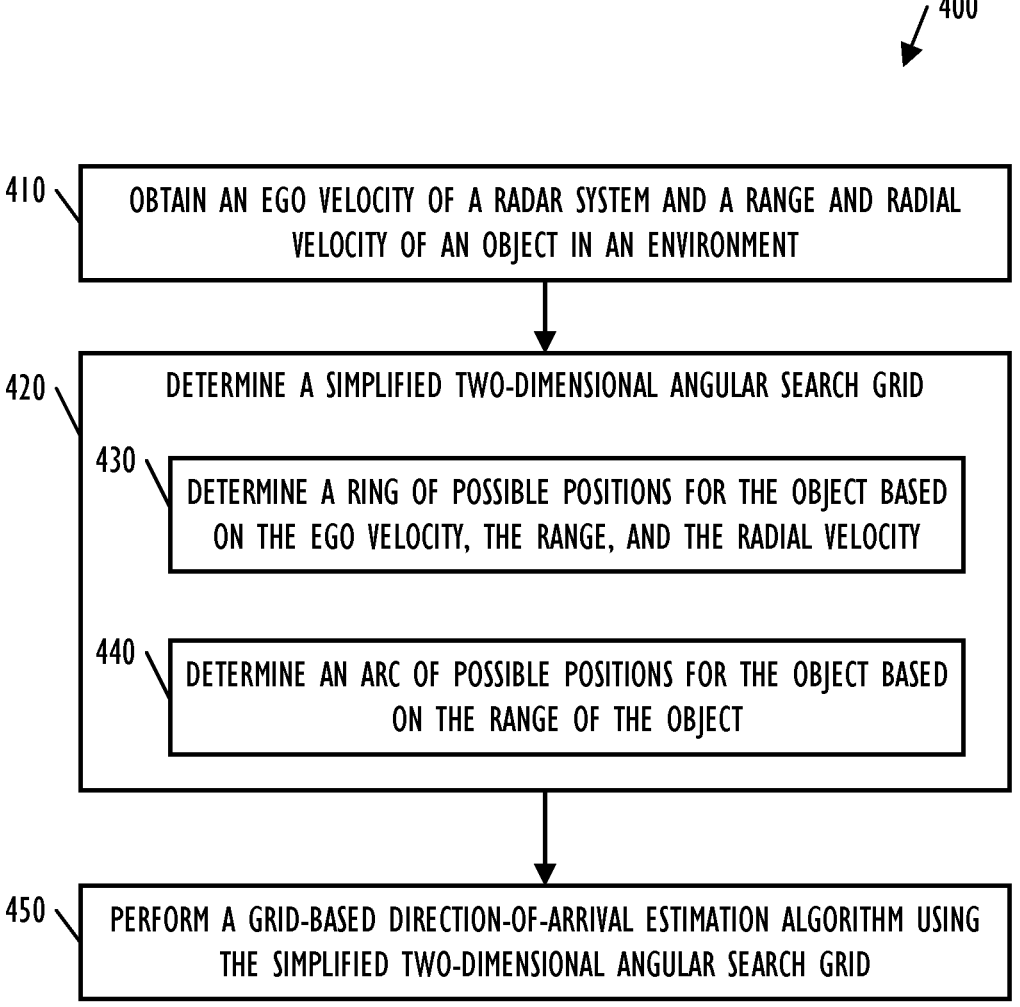

410 — OBTAIN AN EGO VELOCITY OF A RADAR SYSTEM AND A RANGE AND RADIAL VELOCITY OF AN OBJECT IN AN ENVIRONMENT

420 — DETERMINE A SIMPLIFIED TWO-DIMENSIONAL ANGULAR SEARCH GRID

430 — DETERMINE A RING OF POSSIBLE POSITIONS FOR THE OBJECT BASED ON THE EGO VELOCITY, THE RANGE, AND THE RADIAL VELOCITY

440 — DETERMINE AN ARC OF POSSIBLE POSITIONS FOR THE OBJECT BASED ON THE RANGE OF THE OBJECT

450 — PERFORM A GRID-BASED DIRECTION-OF-ARRIVAL ESTIMATION ALGORITHM USING THE SIMPLIFIED TWO-DIMENSIONAL ANGULAR SEARCH GRID

FIG. 4

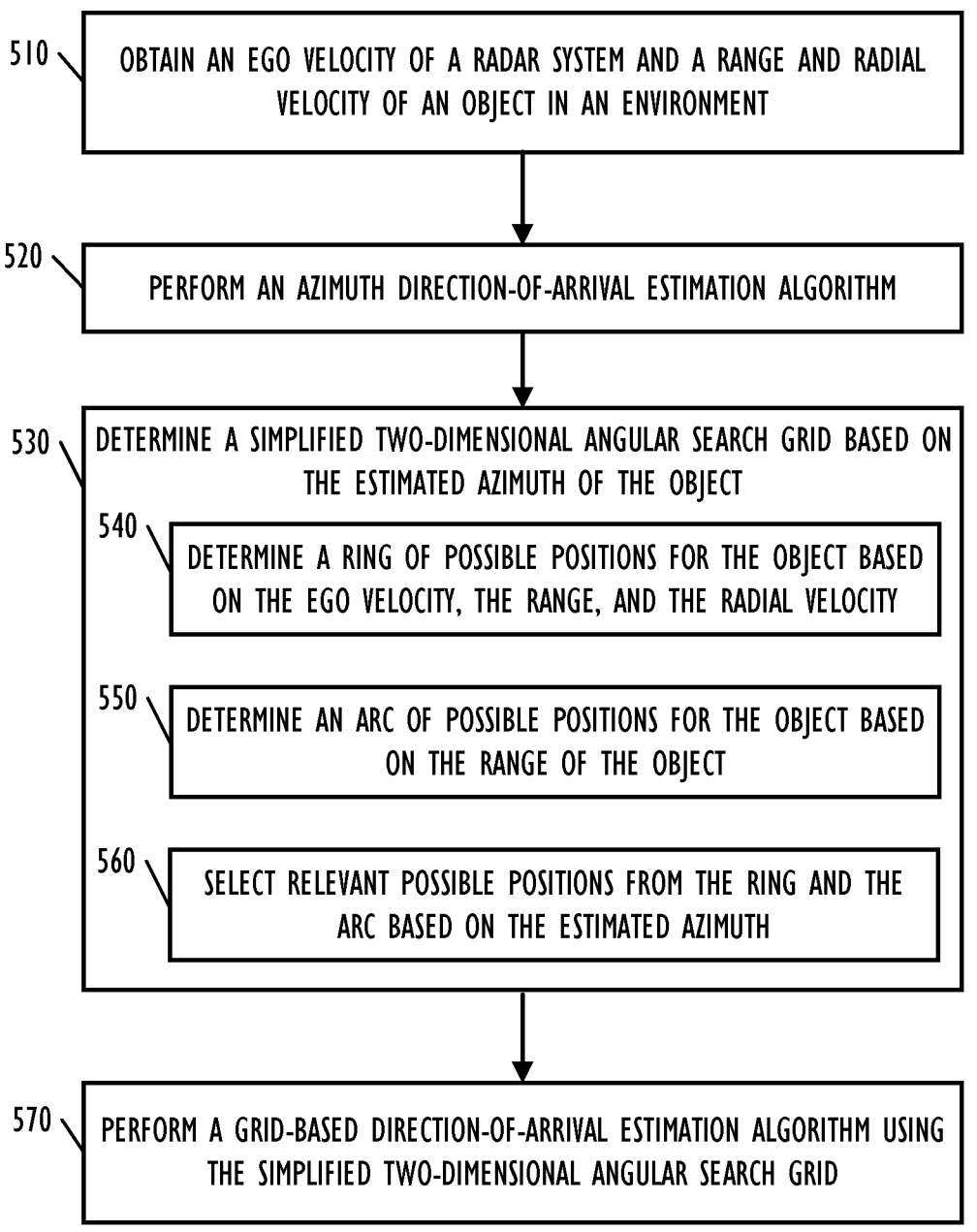

510 — OBTAIN AN EGO VELOCITY OF A RADAR SYSTEM AND A RANGE AND RADIAL VELOCITY OF AN OBJECT IN AN ENVIRONMENT

520 — PERFORM AN AZIMUTH DIRECTION-OF-ARRIVAL ESTIMATION ALGORITHM

530 — DETERMINE A SIMPLIFIED TWO-DIMENSIONAL ANGULAR SEARCH GRID BASED ON THE ESTIMATED AZIMUTH OF THE OBJECT

540 — DETERMINE A RING OF POSSIBLE POSITIONS FOR THE OBJECT BASED ON THE EGO VELOCITY, THE RANGE, AND THE RADIAL VELOCITY

550 — DETERMINE AN ARC OF POSSIBLE POSITIONS FOR THE OBJECT BASED ON THE RANGE OF THE OBJECT

560 — SELECT RELEVANT POSSIBLE POSITIONS FROM THE RING AND THE ARC BASED ON THE ESTIMATED AZIMUTH

570 — PERFORM A GRID-BASED DIRECTION-OF-ARRIVAL ESTIMATION ALGORITHM USING THE SIMPLIFIED TWO-DIMENSIONAL ANGULAR SEARCH GRID

FIG. 5

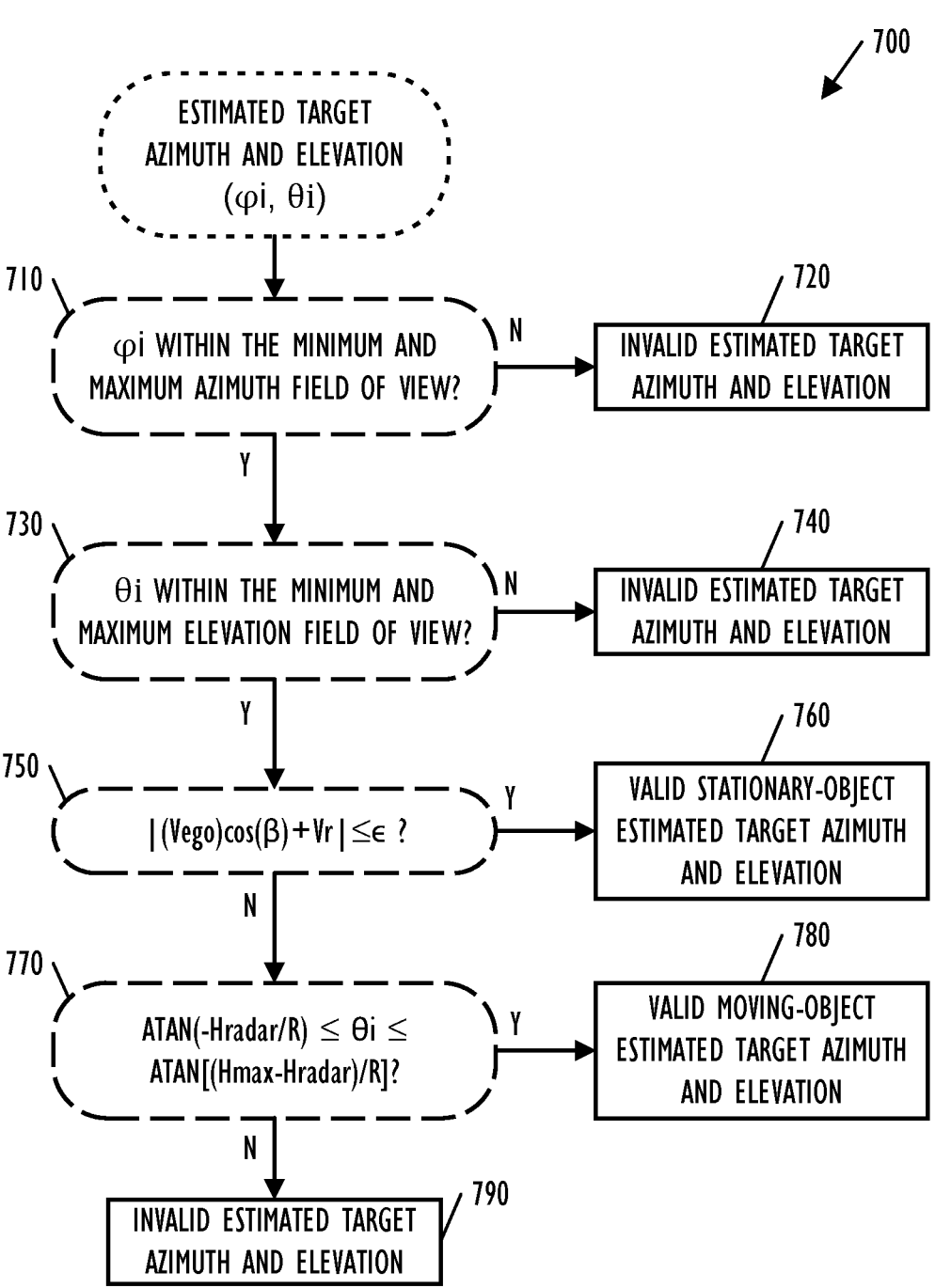

700

ESTIMATED TARGET
AZIMUTH AND ELEVATION
($\varphi i$, $\theta i$)

710

$\varphi i$ WITHIN THE MINIMUM AND
MAXIMUM AZIMUTH FIELD OF VIEW?

N → 720

INVALID ESTIMATED TARGET
AZIMUTH AND ELEVATION

Y

730

$\theta i$ WITHIN THE MINIMUM AND
MAXIMUM ELEVATION FIELD OF VIEW?

N → 740

INVALID ESTIMATED TARGET
AZIMUTH AND ELEVATION

Y

750

$|(Vego)\cos(\beta) + Vr| \leq \epsilon$ ?

Y → 760

VALID STATIONARY-OBJECT
ESTIMATED TARGET AZIMUTH
AND ELEVATION

N

770

$ATAN(-Hradar/R) \leq \theta i \leq$
$ATAN[(Hmax-Hradar)/R]$?

Y → 780

VALID MOVING-OBJECT
ESTIMATED TARGET AZIMUTH
AND ELEVATION

N

790

INVALID ESTIMATED TARGET
AZIMUTH AND ELEVATION

FIG. 7

EGO VELOCITY ASSISTED DIRECTION OF ARRIVAL ESTIMATOR FOR RADAR SYSTEMS

BACKGROUND

Some radar systems are included in vehicles as part of automated driving assistance systems and used to assist in perception of environments around the vehicles. To accurately represent the environment, a radar system must determine the direction of arrival and motion state of objects in the environment. In addition, the radar system must determine the direction of arrival and motion state of object quickly enough to provide meaningful data to the automated driving assistance system. However, some techniques for determining the direction of arrival of objects in the environment are computationally expensive and slow to perform.

BRIEF DESCRIPTION OF THE DRAWINGS

The present invention may be better understood, and its numerous objects, features, and advantages made apparent to those skilled in the art by referencing the accompanying drawings.

FIG. 4 shows, in flow chart form, an example process for determining directions-of-arrival for objects in an environment using a simplified two-dimensional angular search grid, according to one embodiment.

FIG. 5 shows, in flow chart form, an example process for determining directions-of-arrival for objects in an environment using a simplified elevation angular search grid, according to one embodiment.

FIG. 7 shows, in flow chart form, an example process for checking a direction-of-arrival and motion state for an object using a simplified two-dimensional angular search grid, according to one embodiment.

The use of the same reference symbols in different drawings indicates identical items unless otherwise noted. The Figures are not necessarily drawn to scale.

DETAILED DESCRIPTION

As discussed previously herein, some techniques for determining the direction of arrival and motion state of objects in the environment are computationally expensive and time-consuming. The disclosed techniques and radar systems implementing the disclosed techniques are able to determine a simplified two-dimensional (2D) angular search grid based on the ego velocity of the radar system and a range and radial velocity of the object in the environment. The simplified 2D angular search grid can dramatically reduce the number of search grid points to be analyzed, such that a conventional grid-based direction of arrival estimation algorithm can be performed much more quickly with a much lower computation cost compared to searching every azimuth and elevation in the field of view of the radar system. In addition, the simplified 2D angular search grid can be leveraged to provide motion state information for the object in the environment and to cross-check direction of arrival solutions to suppress false targets.

Figure 1:
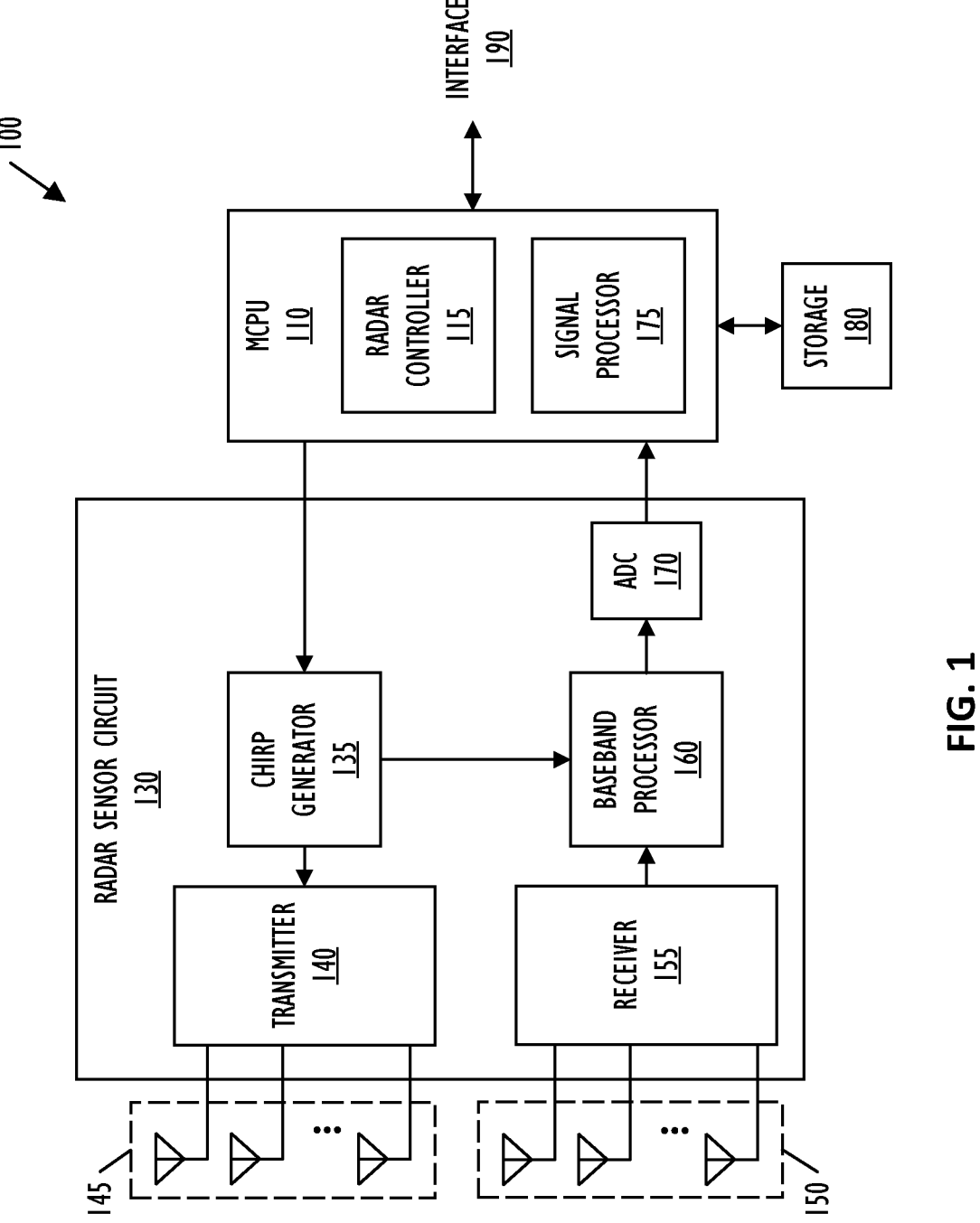
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" of an object is used herein to indicate the angle of arrival of a signal reflected off the object relative to the alignment of the radar system. Although radar system 100 is described herein as a linear chirp radar system, any appropriate radar system that generates range-Doppler information can be used.

In this example, radar system 100 includes a microcontroller and processor unit (MCPU) 110, a radar sensor circuit 130, a first antenna array 145, a second antenna array 150, and storage 180. The MCPU 110 comprises one or more MCPU cores, general purpose processing cores, array or vector processing cores, parallel processing cores, graphic processing units, neural net and linear algebra accelerators, field-programable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programable gate arrays, and the like, or any combination thereof comprised in the MCPU 110.

MCPU 110 includes a radar controller 115 and a signal processor 175. The radar controller 115 can receive data from the radar sensor circuit 130 and control radar parameters of the radar sensor circuit 130 such as frequency band, length of a radar frame, and the like via a serial peripheral interface (SPI), inter-integrated circuit (I2C) interface, an on-chip data bus and the like. A control signal from the radar controller 115 can be used to adjust the radar chirp signals output from a chirp generator 135 included in radar sensor circuit 130. The signal processor 175 in MCPU 110 can also receive the data from the radar sensor circuit 130 and perform signal processing for determining a distance or range between a target object and radar system 100, a radial velocity of the target object, an angle of arrival for the target object, and the like. The signal processor 175 can provide the calculated values to the storage 180 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radar-camera-lidar fusion system; an automated driving assistance system including parking, braking, or lane-change assistance features; and the like. The storage 180 can be used to store instructions for the MCPU 110, received data from the radar sensor circuit 130, calculated values from the signal processor 175, and the like. Storage 180 can be any appropriate storage medium, such as a volatile or non-volatile memory.

The radar sensor circuit 130 includes the chirp generator 135, a transmitter 140, a receiver 155, a baseband processor 160, and an analog-to-digital converter (ADC) 170. The chirp generator 135 can include a local oscillator, for example, and generates radar chirp signals and provides them to the transmitter 140. For example, the chirp generator 135 frequency can modulate a continuous wave signal to form a series of linear chirp signals. The transmitted chirp signal of a known, stable frequency continuous wave varies up and down in frequency over a fixed period of time by the modulated signal. The chirp generator 135 provides the generated chirp signals to the transmitter 140, which drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement.

The receiver 155 receives the reflected signals from the RX antenna array 150 and provides them to the baseband processor 160. The baseband processor 160 also receives the transmitted chirp signals from the chirp generator 135 and down-converts or chirp-compresses the received chirp signals directly into the baseband using the copy of the transmitted chirp signals from the chirp generator 135. The baseband processor 160 can then filter and amplify the baseband signal. The baseband processor 160 provides the filtered and amplified baseband signal to the ADC 170, which digitizes the signal and provides it to the MCPU 110. The signal processor 175 in the MCPU 110 can then perform time domain to frequency domain transforms such as fast Fourier transforms (FFTs) and other signal processing to determine the distance, radial velocity, and angle of arrival between the target object and the radar system 100.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100. Although the radar system 100 is described herein as implementing FFT-based range-Doppler processing, any appropriate transforms may be used to produce the range-Doppler information.

For an implementation in which the radar system 100 is included in a vehicle with an automated driving assistance system, the automated driving assistance system can use the determined distance, velocity, and angle of arrival for objects in the field of view from the radar system 100 to provide parking, braking, or lane-change assistance. The radar system 100 must determine the distance, velocity, and angle of arrival for objects in the field of view of the radar system 100 quickly enough to provide meaningful data to the automated driving assistance system. Radar systems according to the disclosed invention can determine the direction of arrival of objects in the environment more quickly than conventional techniques by using an ego velocity of the radar systems to reduce the search grid and the corresponding computational cost.

Figure 2:
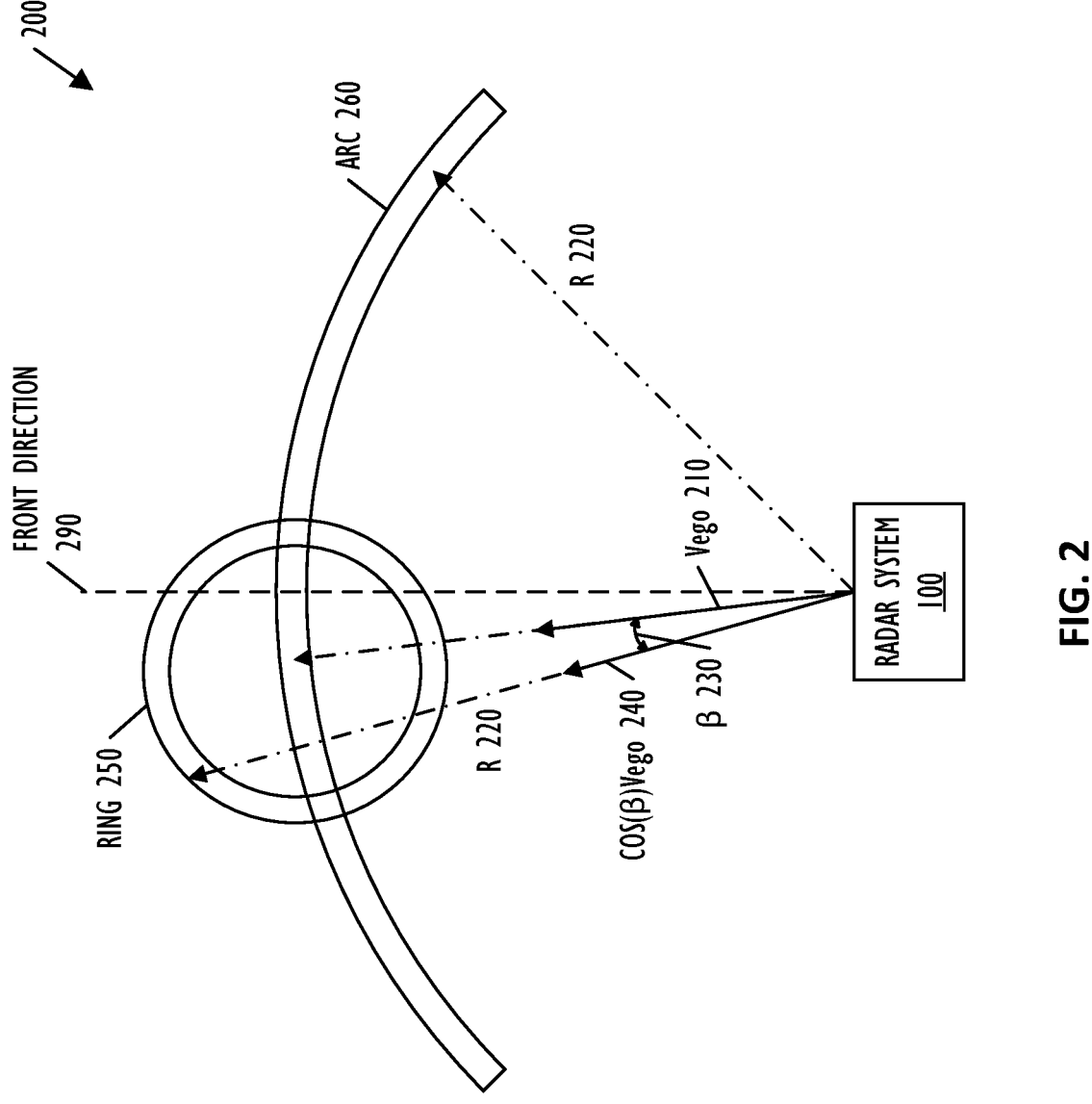
FIG. 2 shows a diagram of a simplified two-dimensional angular search grid for the example radar system shown in FIG. 1, according to one embodiment.

FIG. 2 shows a diagram 200 of a simplified 2D angular search grid for the example radar system 100 shown in FIG. 1, according to one embodiment. For ease of illustration, the diagram 200 is described herein with reference to the radar system 100 shown in FIG. 1. The disclosed ego velocity assisted direction of arrival (EVADoA) algorithm leverages the ego velocity of the radar system 100 and the determined range and radial velocity of an object in the environment to determine a simplified 2D angular search grid that includes a ring 250 and an arc 260. The radar system 100 has an ego velocity Vego 210 at an angle relative to a forward direction 290; that is, relative to the forward direction 290, the radar system 100 moves at an angle with an ego velocity Vego 210. The ego velocity Vego 210 of the radar system 100 can be determined using a ground-reflection based ego velocity estimation algorithm or obtained from an external source, such as from a speedometer, a global positioning system (GPS), or an inertial measurement unit (IMU) of a vehicle on which the radar system 100 is included.

The radar system 100 determines that an object in the environment has a range R 220 from the radar system 100 and a radial velocity Vr, for example by performing a range FFT and a Doppler FFT on received radar data as described herein with respect to FIG. 1. The ring 250 indicates possible positions of a stationary object in the environment, and the arc 260 indicates possible positions of a moving object in the environment. The ring 250 is vertical and centered on the direction of the ego velocity Vego 210, and the face of the ring 250 is perpendicular to the direction of the ego velocity Vego 210. The opening angle between the ring 250 and the direction of the ego velocity Vego 210 is represented as an angle β 230, where the angle β 230 is determined based on the ego velocity Vego 210 and the determined radial velocity Vr. For example, the radial velocity Vr can be represented as:

$$V_r \cong -\cos(\beta) * V_{ego}$$

That is, each possible position in the ring 250 is the distance R 220 from the radar system 100, centered around the direction of the ego velocity Vego 210. The angle between the ego velocity Vego 210 and the velocity of the object represented as $\cos(\beta)*V_{ego}$ 240 is the angle β 230. A width of the ring 250 can be chosen based on the resolution of the determined radial velocity, such that each possible position in the ring 250 has a projected velocity approximately equal to the determined radial velocity, within a tolerance determined by the resolution of the determined radial velocity. For example, a tolerance e can be chosen based on the sum of the radial velocity measurement resolution and error and the ego velocity measurement resolution and error, such that:

$$|V_r + \cos(\beta) * V_{ego}| \le \epsilon$$

Possible positions in the ring 250 that are outside a relevant elevation field of view can be omitted. For example, a radar system 100 has an elevation field of view of −30° to 30°; any possible positions in the ring 250 with elevations less than −30° or greater than 30° can be omitted.

The arc 260 indicates possible positions of a moving object in the environment. In implementations in which the radar system 100 is included in a vehicle as part of an automated driving assistance system, moving objects of interest to the automated driving assistance system such as pedestrians, strollers, bicycles, other vehicles, and the like are present on the ground surface. That is, moving objects that are in the air, such as airplanes or birds, or that are under the ground, such as subway cars, are not relevant or of interest to the automated driving assistance system. As a result, the search grid for moving objects can be reduced to the arc 260 of possible positions that are on the ground surface and the distance R 220 from the radar system 100. In some implementations, the arc 260 of possible positions of a moving object in the environment can be at a 0° elevation. In other implementations, the arc 260 of possible positions of a moving object in the environment can be chosen based on a maximum relevant height and the range R 220 from the radar system 100, as described further herein with respect to FIG. 3.

The disclosed EVADoA algorithm simplifies the 2D azimuth-elevation search grid for determining the direction of arrival of objects in the environment to the ring 250 and the arc 260. For example, a radar systems has an azimuth field of view of −90° to 90° with a 0.5° grid size and an elevation field of view of −30° to 30° with a 0.5° grid size. The total 2D search grid for the direction of arrival is 361 by 121, totaling 43,681 search points. The simplified 2D search grid includes the ring 250 and the arc 260. The ring 250 can include at most 361 search points, if the ring 250 is entirely within the elevation field of view, and fewer than 361 search points if the ring 250 is partially cut off into two segments. The arc 260 can be a single azimuth search of 361 search points at an elevation angle corresponding to the ground surface. Thus, the simplified 2D search grid determined by the disclosed EVADoA algorithm can result in a 98% reduction in the computational cost for determining the direction of arrival.

For a known range R 220, radial velocity, and Vego 210, as well as the azimuth and elevation fields of view, a directional vector $\bar{\gamma}_i$ from the phase center of the radar system 100 to an i-th angular search point $(\varphi_i, \theta_i)$ can be represented as:

$$\bar{\gamma}_i = (\cos(\theta_i)\sin(\varphi_i))\bar{x} + (\cos(\theta_i)\cos(\varphi_i))\bar{y} + (\sin(\theta_i))\bar{z}$$

where $\theta_i$ is the elevation angle in radians for the i-th search point, $\varphi_i$ is the azimuth angle in radians for the i-th search point, $\bar{x}$ is a unit-length directional vector perpendicular to the front direction 290 and pointing to the right (i.e., pointing 90 degrees clockwise from the front direction 290 on the horizontal plane), $\bar{y}$ is a unit-length direction vector in the front direction 290, and $\bar{z}$ is a unit-length direction vector perpendicular upwards of front direction 290 and normal to the horizontal plane, and assuming the range is equal to the known range R 220 within a range tolerance $b_R$. Every point on the arc 260 and the ring 250 results in the same range R 220 to the phase center of the radar. In some implementations, the range tolerance $b_R$ is representative of a 95% confidence error bound for the range R 220.

The directional vector $\bar{\gamma}_i$ for the i-th search point $(\varphi_i, \theta_i)$ and the ego velocity Vego 210 are related by the angle $\beta_i$ 230, which can be represented as:

$$\cos(\beta_i) \equiv \bar{y} \cdot \bar{\gamma}_i = \cos(\theta_i) * \cos(\varphi_i)$$

where "·" represents an inner product operation. For the i-th search point $(\varphi_i, \theta_i)$ to qualify as a possible position of a stationary object—that is, for the i-th search point $(\varphi_i, \theta_i)$ to be included in the ring 250—the elevation angle $\theta_i$ must be within the elevation field of view, and the azimuth angle $\varphi_i$ must be within the azimuth field of view. In addition, the i-th search point $(\varphi_i, \theta_i)$ qualifies as a possible position of a stationary object in response to the radial velocity Vr, the angle $\beta_i$ 230, and the ego velocity Vego 210 satisfying the condition represented as:

$$|V_r + \cos(\beta_i) * V_{ego}| \le \epsilon$$

where $\epsilon$ represents a tolerance threshold determined based on the radial velocity measurement resolution and error and the ego velocity measurement resolution and error. For example, the tolerance threshold $\epsilon$ can be represented as:

$$\epsilon = b_{V_{ego}} * \cos(\beta_i) + b_{V_r}$$

where $b_{V_{ego}}$ represents an ego velocity error tolerance and $b_{V_r}$ represents a radial velocity error tolerance. In some implementations, $b_{V_{ego}}$ and $b_{V_r}$ are representative of 95% confidence error bounds.

For the i-th search point $(\varphi_i, \theta_i)$ to qualify as a possible position of a moving object—that is, for the i-th search point $(\varphi_i, \theta_i)$ to be included in the arc 260—the azimuth angle $\varphi_i$ must be within the azimuth field of view. In addition, the elevation angle $\theta_i$ must be at least within the elevation field of view. The height of the radar system 100 and a maximum relevant object height can further reduce the number of possible elevation angles for the elevation angle $\theta_i$, as described further herein with respect to FIG. 3.

Figure 3:
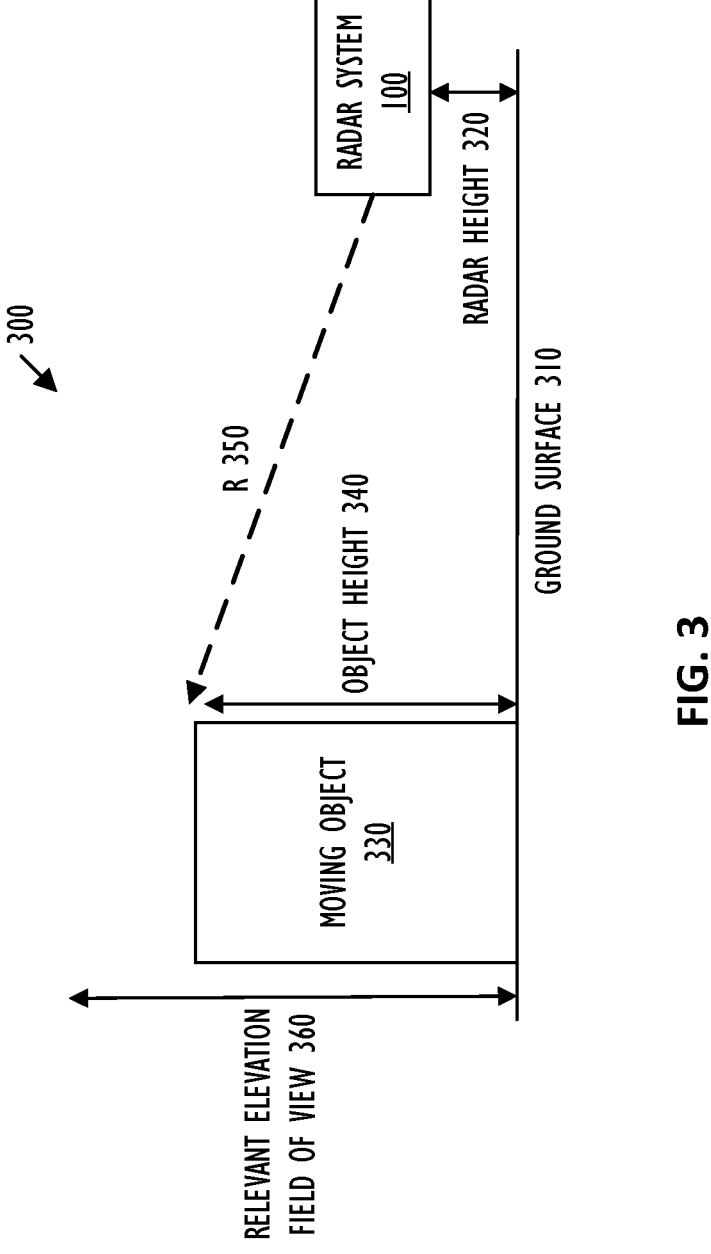
FIG. 3 shows a diagram of a relevant elevation field of view for the example radar system shown in FIG. 1, according to one embodiment.

FIG. 3 shows a diagram 300 of a relevant elevation field of view for the example radar system shown in FIG. 1, according to one embodiment. For ease of illustration, the diagram 300 is described herein with respect to the radar system 100 shown in FIG. 1. The diagram 300 includes the radar system 100 having a radar height 320 above the ground surface 310 and a moving object 330 that has an object height 340 and is a distance R 350 from the radar system 100. The relevant elevation field of view 360 of the radar system 100 can be chosen to extend from the ground surface 310 to a maximum relevant object height. For example, in implementations in which the radar system 100 is incorporated into a vehicle as part of an automated driving assistance system, the maximum relevant object height can be chosen to be a maximum height of semi-trailer trucks on the road, such as 14 feet. The object height 340 is less than the maximum height of the relevant elevation field of view and greater than 0.

As discussed previously herein, the height of the radar system 100 and the maximum relevant object height can further reduce the number of possible elevation angles for the elevation angle $\theta_i$ in the i-th search point $(\varphi_i, \theta_i)$, for the i-th search point ($\varphi_i$, $\theta_i$) to be included in the arc 260. An object's elevation angle $\theta$ is related to the height of the radar system 100 and the maximum relevant object height by the equation:

$$\tan(\theta) = \frac{H_{max} - H_{radar}}{R}$$

where Hmax represents the maximum relevant object height, Hradar is the height of the radar system 100, and R represents the range R 220. Thus to be included in the arc 260, the elevation angle $\theta_i$ for the i-th search point ($\varphi_i$, $\theta_i$) must be greater than or equal to the larger of the minimum elevation field of view and $$\operatorname{atan}\left(\frac{-H_{radar}}{R}\right),$$

and less than or equal to the smaller of the maximum elevation field of view and $$\operatorname{atan}\left(\frac{H_{max} - H_{radar}}{R}\right).$$

FIG. 4 shows, in flow chart form, an example process 400 for determining directions-of-arrival for objects in an environment using a simplified two-dimensional angular search grid, according to one embodiment. For ease of illustration, the process 400 is described herein with reference to the radar system 100 shown in FIG. 1 and the diagram 200 shown in FIG. 2. The process 400 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 400 are shown in a particular order in FIG. 4, but the steps of process 400 may be performed in a different order and/or some steps may be performed simultaneously. One or more steps of process 400 can be optional, and process 400 can include additional steps.

The process begins at step 410, at which signal processor 175 obtains an ego velocity Vego 210 of the radar system 100 and a range R 220 and a radial velocity Vr of an object in an environment of the radar system 100. For example, the ego velocity Vego 210 of the radar system 100 can be determined using a ground-reflection based ego velocity estimation algorithm or obtained from an external source, such as from a speedometer or GPS/IMU module of a vehicle on which the radar system 100 is included. The range R 220 and the radial velocity Vr can be obtained, for example, by performing a range FFT and a Doppler FFT on received radar data as described herein with respect to FIG. 1. At step 420, the signal processor 175 determines a simplified 2D angular search grid.

Step 420 includes steps 430 and 440. At step 430, the signal processor 175 determines a ring 250 of possible positions for a stationary object in the environment based on the ego velocity Vego 210, the range R 220, and the radial velocity Vr. For example as described further herein with respect to FIG. 2, an i-th search point ($\varphi_i$, $\theta_i$) is included in the ring 250 in response to the elevation angle $\theta_i$ being within the elevation field of view, the azimuth angle $\varphi_i$ being within the azimuth field of view, and the radial velocity Vr, the angle $\beta_i$ 230, and the ego velocity Vego 210 satisfying the condition represented as:

$$|V_r + \cos(\beta_i) * V_{ego}| \leq \epsilon$$

At step 440, the signal processor 175 determines an arc 260 of possible positions for a moving object in the environment based on the range R 220 of the object. For example, the arc 260 can be at an elevation corresponding to a ground surface of the environment and the possible positions having the range R 220 from the radar system 100. In some implementations, the arc 260 can be chosen based on the height Hradar of the radar system 100 and the maximum relevant object height Hmax. That is, the arc 260 can include possible positions having elevations within the elevation field of view, greater than or equal to:

$$\operatorname{atan}\left(\frac{-H_{radar}}{R}\right),$$

and less than or equal to $$\operatorname{atan}\left(\frac{H_{max} - H_{radar}}{R}\right).$$

At step 450, the signal processor 175 performs a grid-based direction-of-arrival estimation algorithm using the simplified 2D angular search grid determined in step 420. The signal processor 175 can use any appropriate grid-based direction-of-arrival estimation algorithm, such as a Fourier beamformer (e.g. Fast Fourier Transform or Discrete Fourier Transform), a Capon beamformer, an orthogonal matching pursuit (OMP) algorithm, a multiple signal classification (MUSIC) algorithm, deterministic maximum likelihood (DML) algorithm, a Basis Pursuit (BP), an Iterative Adaptive Approach (IAA), and the like. The simplified 2D angular search grid including the ring 250 and the arc 260 reduces the computational cost of performing the grid-based direction-of-arrival estimation algorithm at step 450 compared to techniques that scan the entire azimuth and elevation fields of view. The result of the process 400 is a direction of arrival for the object in the environment, as well as motion state information, such as whether the object is moving or stationary.

FIG. 5 shows, in flow chart form, an example process 500 for determining directions-of-arrival for objects in an environment using a simplified elevation angular search grid, according to one embodiment. For ease of illustration, the process 500 is described herein with reference to the radar system 100 shown in FIG. 1 and the diagram 200 shown in FIG. 2. The process 500 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 500 are shown in a particular order in FIG. 5, but the steps of process 500 may be performed in a different order and/or some steps may be performed simultaneously. One or more steps of process 500 can be optional, and process 500 can include additional steps.

The process begins at step 510, at which signal processor 175 obtains an ego velocity Vego 210 of the radar system 100 and a range R 220 and a radial velocity Vr of an object in an environment of the radar system 100. For example, the ego velocity Vego 210 of the radar system 100 can be determined using a ground-based ego velocity estimation algorithm or obtained from an external source, such as from a speedometer or GPS/IMU module of a vehicle on which the radar system 100 is included. The range R 220 and the radial velocity Vr can be obtained, for example, by performing a range FFT and a Doppler FFT on received radar data as described herein with respect to FIG. 1. At step 520, the signal processor 175 performs an azimuth direction-of-arrival estimation algorithm. Any appropriate azimuth direction-of-arrival estimation algorithm can be used, such as a Fourier beamformer (e.g. Fast Fourier Transform or Discrete Fourier Transform), a Capon beamformer, an OMP algorithm, a MUSIC algorithm, a DML algorithm, a BP algorithm, an IAA, and the like.

At step 530, the signal processor 175 determines a simplified 2D angular search grid based on the azimuth of the object determined at step 520. Step 530 includes steps 540, 550, and 560. At step 540, the signal processor 175 determines a ring 250 of possible positions for a stationary object based on the ego velocity Vego 210, the range R 220, and the radial velocity Vr. For example, an i-th search point $(\varphi_i, \theta_i)$ is included in the ring 250 in response to the elevation angle $\theta_i$ being within the elevation field of view, the azimuth angle $\varphi_i$ being within the azimuth field of view, and the radial velocity Vr, the angle $\beta_i$ 230, and the ego velocity Vego 210 satisfying the condition represented as:

$$|V_r + \cos(\beta_i) * V_{ego}| \le \epsilon$$

At step 550, the signal processor 175 determines an arc 260 of possible positions for a moving object in the environment based on the range R 220 of the object. For example, the arc 260 can be at an elevation corresponding to a ground surface of the environment and include the possible positions having the range R 220 from the radar system 100. In some implementations, the arc 260 can be chosen based on the height Hradar of the radar system 100 and the maximum relevant object height Hmax. That is, the arc 260 can include possible positions having elevations within the elevation field of view, greater than or equal to $$\operatorname{atan}\left(\frac{-H_{radar}}{R}\right),$$

and less than or equal to $$\operatorname{atan}\left(\frac{H_{max} - H_{radar}}{R}\right).$$

At step 560, the signal processor 175 selects relevant possible positions from the ring 250 and the arc 260 based on the estimated azimuth. That is, the signal processor 175 selects the possible positions in the ring 250 and the arc 260 that have the estimated azimuth, such that the simplified 2D angular search grid includes the portions of the ring 250 having the estimated azimuth and the portion of the arc 260 that has the estimated azimuth. At step 570, the signal processor 175 performs a grid-based elevation direction-of-arrival estimation algorithm using the simplified 2D angular search grid determined in step 530. The signal processor 175 can use any appropriate grid-based elevation direction-of-arrival estimation algorithm, such as a Fourier beamformer (e.g. Fast Fourier Transform or Discrete Fourier Transform), a Capon beamformer, an OMP algorithm, a MUSIC algorithm, a DML algorithm, a BP algorithm, an IAA, and the like. The simplified 2D angular search grid determined at step 530 can reduce the computational cost of determining the elevation of the object compared to techniques that scan the entire elevation field of view at the determined azimuth of the object. The result of the process 500 is a direction of arrival for the object in the environment, as well as motion state information, such as whether the object is moving or stationary.

Figure 6:
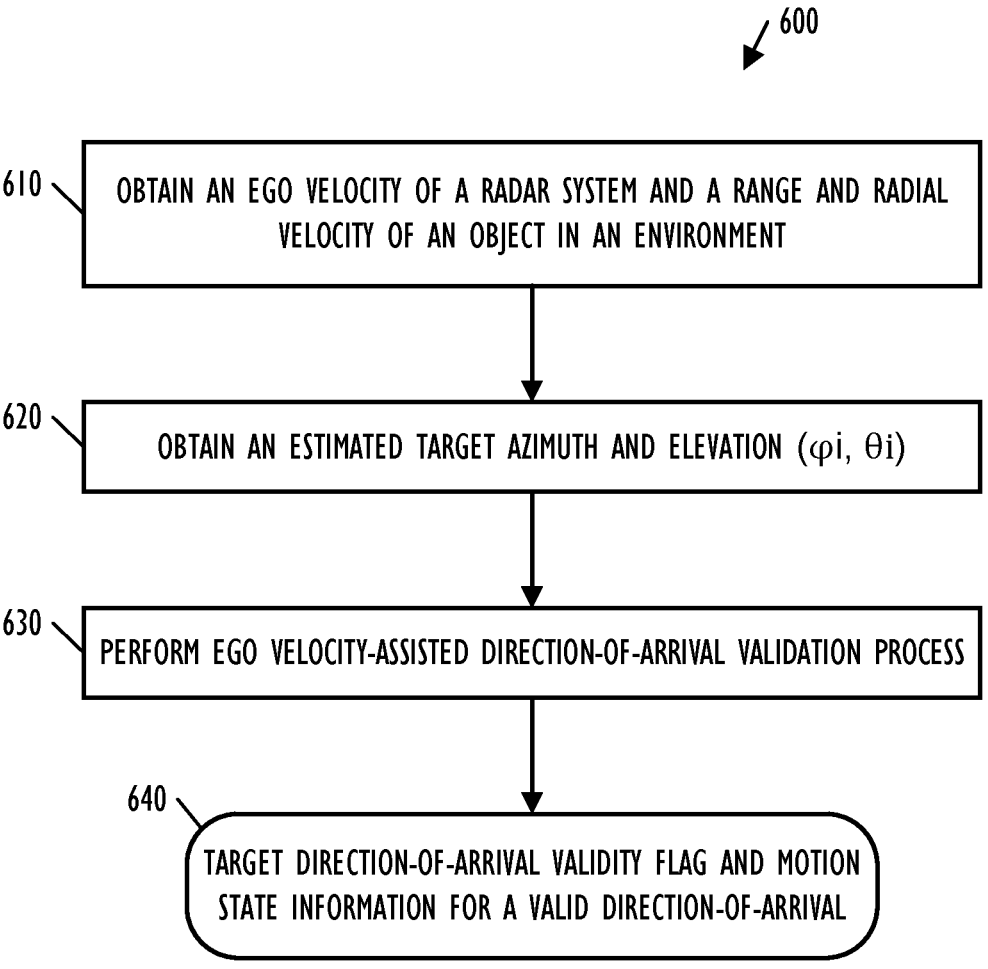
FIG. 6 shows, in flow chart form, an example process for determining a direction-of-arrival and motion state for an object in an environment, according to one embodiment.

FIG. 6 shows, in flow chart form, an example process 600 for determining a direction-of-arrival and motion state for an object in an environment, according to one embodiment. For ease of illustration, the process 600 is described herein with reference to the radar system 100 shown in FIG. 1 and the diagram 200 shown in FIG. 2. The process 600 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 600 are shown in a particular order in FIG. 6, but the steps of process 600 may be performed in a different order and/or some steps may be performed simultaneously. One or more steps of process 600 can be optional, and process 600 can include additional steps.

The process begins at step 610, at which signal processor 175 obtains an ego velocity Vego 210 of the radar system 100 and a range R 220 and a radial velocity Vr of an object in an environment of the radar system 100. For example, the ego velocity Vego 210 of the radar system 100 can be determined using a ground-reflection based ego velocity estimation algorithm or obtained from an external source, such as from a speedometer or GPS/IMU module of a vehicle on which the radar system 100 is included. The range R 220 and the radial velocity Vr can be obtained, for example, by performing a range FFT and a Doppler FFT on received radar data as described herein with respect to FIG. 1. At step 620, the signal processor 175 obtains an estimated target azimuth and elevation $(\varphi_i, \theta_i)$ for the object. For example, the signal processor 175 can obtain the estimated target azimuth and elevation $(\varphi_i, \theta_i)$ for the object from another processor.

At step 630, the signal processor 175 performs an EVADoA validation process, such as the EVADoA validation process 700 described further herein with respect to FIG. 7. The output 640 from the EVADoA validation process performed at step 630 is a target direction-of-arrival validity flag and motion state information for a valid direction-of-arrival. That is, the output 640 includes a target direction-of-arrival validity flag that is indicative of whether the estimated target azimuth and elevation $(\varphi_i, \theta_i)$ for the object is valid, and if so, motion state information for the object, such as whether the object is stationary or moving.

FIG. 7 shows, in flow chart form, an example EVADoA validation process 700 for checking an estimated target azimuth and elevation $(\varphi_i, \theta_i)$ and motion state for an object using a simplified two-dimensional angular search grid, according to one embodiment. For ease of illustration, the process 700 is described herein with reference to the radar system 100 shown in FIG. 1 and the diagram 200 shown in FIG. 2. The process 700 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 700 are shown in a particular order in FIG. 7, but the steps of process 700 may be performed in a different order and/or some steps may be performed simultaneously. One or more steps of process 700 can be optional, and process 700 can include additional steps.

The process begins at step 710, at which signal processor 175 determines whether the estimated azimuth $\varphi_i$ is within the minimum and maximum azimuth field of view of the radar system 100. In response to the estimated azimuth $\varphi_i$ not being within the minimum and maximum azimuth field of view, the signal processor 175 outputs an indication 720 of an invalid estimated target azimuth and elevation. In response to the estimated azimuth $\varphi_i$ being within the minimum and maximum azimuth field of view, the signal processor 175 proceeds to step 730, and determines whether the estimated elevation $\theta_i$ is within the minimum and maximum elevation field of view of the radar system 100. In response to the estimated elevation $\theta_i$ not being within the minimum and maximum elevation field of view, the signal processor 175 outputs an indication 740 of an invalid estimated target azimuth and elevation.

In response to the estimated elevation $\theta_i$ being within the minimum and maximum elevation field of view, the signal processor 175 proceeds to step 750, and determines whether the radial velocity Vr, the angle $\beta_i$ 230, and the ego velocity Vego 210 satisfy the condition represented as:

$$|V_r + \cos(\beta_i) * V_{ego}| \leq \epsilon$$

where $\epsilon$ represents a tolerance threshold determined based on the radial velocity measurement resolution and error and the ego velocity measurement resolution and error. For example, the tolerance threshold $\epsilon$ can be represented as:

$$\epsilon = b_{V_{ego}} * \cos(\beta_i) + b_{V_r}$$

where $b_{V_{ego}}$ represents an ego velocity error tolerance and $b_{V_r}$ represents a radial velocity error tolerance. In some implementations, $b_{V_{ego}}$ and $b_{V_r}$ are representative of 95% confidence error bounds.

In response to the condition represented as:

$$|V_r + \cos(\beta_i) * V_{ego}| \leq \epsilon$$

being satisfied, the signal processor 175 outputs an indication 760 of a valid stationary-object estimated target azimuth and elevation. In response to the condition not being satisfied, the signal processor 175 proceeds to step 770, and determines whether the estimated elevation $\theta_i$ is greater than or equal to $$\text{atan}\left(\frac{-H_{radar}}{R}\right),$$

where Hradar is a height of the radar system 100, and less than or equal to $$\text{atan}\left(\frac{H_{max} - H_{radar}}{R}\right),$$

where Hmax represents a maximum relevant object height. In response to the estimated elevation $\theta_i$ being greater than or equal to $$\text{atan}\left(\frac{-H_{radar}}{R}\right)$$

and less than or equal to $$\text{atan}\left(\frac{H_{max} - H_{radar}}{R}\right),$$

the signal processor 175 outputs an indication 780 of a valid moving-object estimated target azimuth and elevation. In response to the estimated elevation $\theta_i$ not being greater than or equal to $$\text{atan}\left(\frac{-H_{radar}}{R}\right)$$

and less than or equal to $$\text{atan}\left(\frac{H_{max} - H_{radar}}{R}\right),$$

the signal processor 175 outputs an indication 790 of an invalid estimated target azimuth and elevation.

As described herein, the disclosed techniques for determining a simplified 2D angular search grid reduces the computational cost and processing time of determining the direction of arrival for objects in the environment of a radar system, such that a radar system can provide accurate direction of arrival and motion state information for object in the environment in a timely manner. Using the ego velocity of the radar system and the range and radial velocity of the object in the environment, a radar system can determine a simplified 2D angular search grid that includes a ring of possible positions for a stationary object and an arc of possible positions for a moving object. Conventional grid-based direction of arrival algorithms can then be performed on the simplified 2D angular search grid to obtain the direction of arrival and motion state of the object in the environment.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A radar system includes at least one processor and at least one non-transitory computer-readable medium storing machine instructions. When executed by the at least one processor, the machine instructions cause the at least one processor to obtain an ego velocity Vego of a radar system, a range R of an object in an environment of the radar system, and a radial velocity Vr of the object. The at least one processor determines a simplified two-dimensional (2D) angular search grid and performs a grid-based direction-of-arrival algorithm using the simplified 2D angular search grid.

In some implementations, the machine instructions to determine the simplified 2D angular search grid include machine instructions to determine a ring of possible positions for a stationary object based on the ego velocity Vego, the range R, and the radial velocity Vr. The simplified 2D angular search grid includes the ring of possible positions. In some implementations, the non-transitory computer-readable medium also stores machine instructions that cause the at least one processor to perform an azimuth direction-of-arrival estimation algorithm to obtain an estimated azimuth for the object in the environment. The machine instructions to determine the simplified 2D angular search grid include machine instructions to select a subset of relevant possible positions from the ring of possible positions having the estimated azimuth. The simplified 2D angular search grid includes the subset of relevant possible positions.

In some implementations, the machine instructions to determine the simplified 2D angular search grid include machine instructions to determine an arc of possible positions for a moving object based on the range R. The simplified 2D angular search grid includes the arc of possible positions. In some implementations, the non-transitory computer-readable medium also stores machine instructions that cause the at least one processor to perform an azimuth direction-of-arrival estimation algorithm to obtain an estimated azimuth for the object in the environment. The machine instructions to determine the simplified 2D angular search grid include machine instructions to select a subset of relevant possible positions from the arc of possible positions having the estimated azimuth. The simplified 2D angular search grid includes the subset of relevant possible positions.

In some implementations, the arc of possible positions includes possible positions having an elevation corresponding to a ground level of the environment. In some implementations, the arc of possible positions includes possible positions having elevations within a range of relevant elevations selected based on a height of the radar system in the environment and a maximum relevant object height. In some implementations, the arc of possible positions includes possible positions having elevations greater than or equal to $$\operatorname{atan}\left(\frac{-H_{radar}}{R}\right)$$

and less than or equal to $$\operatorname{atan}\left(\frac{H_{max} - H_{radar}}{R}\right),$$

where Hradar represents the height of the radar system in the environment and Hmax represents the maximum relevant object height.

In some implementations, the non-transitory computer-readable medium also stores machine instructions that cause the at least one processor to obtain an estimated target azimuth and an estimated target elevation for the object in the environment. The at least one processor determines whether the estimated target azimuth is within a minimum and maximum azimuth field of view (FOV) of the radar system. In response to the estimated target azimuth not being within the minimum and maximum azimuth FOV, the at least one processor outputs a notification indicative of an invalid estimated target azimuth and elevation. In response to the estimated target azimuth being within the minimum and maximum azimuth FOV, the at least one processor determines whether the estimated target elevation is within a minimum and maximum elevation FOV of the radar system.

In response to the estimated target elevation not being within the minimum and maximum elevation FOV, the at least one processor outputs the notification indicative of the invalid estimated target azimuth and elevation. In response to the estimated target elevation being within the minimum and maximum elevation FOV, the at least one processor determines whether $|Vego \cos(\beta)+Vr|$ satisfies a tolerance criterion, where $\beta$ represents an angle between the ego velocity Vego and the radial velocity Vr. In response to $|Vego \cos(\beta)+Vr|$ satisfying the tolerance criterion, the at least one processor outputs a notification indicative of a valid stationary-object estimated target azimuth and elevation. In response to $|Vego \cos(\beta)+Vr|$ not satisfying the tolerance criterion, the at least one processor determines whether the estimated target elevation is greater than or equal to $$\operatorname{atan}\left(\frac{-Hrad}{R}\right)$$

and less than or equal to $$\operatorname{atan}\left(\frac{Hmax - Hrad}{R}\right),$$

where Hrad represents a height of the radar system in the environment and Hmax represents a maximum relevant object height.

In response to the estimated target elevation being greater than or equal to $$\operatorname{atan}\left(\frac{-Hrad}{R}\right)$$

15 and less than or equal to $$\operatorname{atan}\left(\frac{Hmax - Hrad}{R}\right),$$

the at least one processor outputs a notification indicative of a valid moving-object estimated target azimuth and elevation. In response to the estimated target elevation not being greater than or equal to $$\operatorname{atan}\left(\frac{-Hrad}{R}\right)$$

and less than or equal to $$\operatorname{atan}\left(\frac{Hmax - Hrad}{R}\right),$$

the at least one processor outputs the notification indicative of the invalid estimated target azimuth and elevation.

A non-transitory computer-readable medium stores machine instructions that, when executed by at least one processor, cause the at least one processor to obtain an ego velocity Vego of a radar system, a range R of an object in an environment of the radar system, and a radial velocity Vr of the object. The machine instructions cause the at least one processor to determine a simplified two-dimensional (2D) angular search grid and performs a grid-based direction-of-arrival algorithm using the simplified 2D angular search grid.

In some implementations, the machine instructions to determine the simplified 2D angular search grid include machine instructions to determine a ring of possible positions for a stationary object based on the ego velocity Vego, the range R, and the radial velocity Vr. The simplified 2D angular search grid includes the ring of possible positions. In some implementations, the non-transitory computer-readable medium also stores machine instructions that cause the at least one processor to perform an azimuth direction-of-arrival estimation algorithm to obtain an estimated azimuth for the object in the environment. The machine instructions to determine the simplified 2D angular search grid include machine instructions to select a subset of relevant possible positions from the ring of possible positions having the estimated azimuth. The simplified 2D angular search grid includes the subset of relevant possible positions.

In some implementations, the machine instructions to determine the simplified 2D angular search grid include machine instructions to determine an arc of possible positions for a moving object based on the range R. The simplified 2D angular search grid includes the arc of possible positions. In some implementations, the non-transitory computer-readable medium also stores machine instructions that cause the at least one processor to perform an azimuth direction-of-arrival estimation algorithm to obtain an estimated azimuth for the object in the environment. The machine instructions to determine the simplified 2D angular search grid include machine instructions to select a subset of relevant possible positions from the arc of possible positions having the estimated azimuth. The simplified 2D angular search grid includes the subset of relevant possible positions.

In some implementations, the arc of possible positions includes possible positions having an elevation corresponding to a ground level of the environment. In some implementations, the arc of possible positions includes possible positions having elevations within a range of relevant elevations selected based on a height of the radar system in the environment and a maximum relevant object height. In some implementations, the arc of possible positions includes possible positions having elevations greater than or equal to $$\operatorname{atan}\left(\frac{-H_{radar}}{R}\right)$$

and less than or equal to $$\operatorname{atan}\left(\frac{H_{max} - H_{radar}}{R}\right),$$

where Hradar represents the height of the radar system in the environment and Hmax represents the maximum relevant object height.

In some implementations, the non-transitory computer-readable medium also stores machine instructions that cause the at least one processor to obtain an estimated target azimuth and an estimated target elevation for the object in the environment. The machine instructions cause the at least one processor to determine whether the estimated target azimuth is within a minimum and maximum azimuth field of view (FOV) of the radar system. In response to the estimated target azimuth not being within the minimum and maximum azimuth FOV, the machine instructions cause the at least one processor to output a notification indicative of an invalid estimated target azimuth and elevation. In response to the estimated target azimuth being within the minimum and maximum azimuth FOV, the machine instructions cause the at least one processor to determine whether the estimated target elevation is within a minimum and maximum elevation FOV of the radar system.

In response to the estimated target elevation not being within the minimum and maximum elevation FOV, the machine instructions cause the at least one processor to output the notification indicative of the invalid estimated target azimuth and elevation. In response to the estimated target elevation being within the minimum and maximum elevation FOV, the machine instructions cause the at least one processor to determine whether |Vego cos(β)+Vr| satisfies a tolerance criterion, where β represents an angle between the ego velocity Vego and the radial velocity Vr. In response to |Vego cos(β)+Vr| satisfying the tolerance criterion, the machine instructions cause the at least one processor to output a notification indicative of a valid stationary-object estimated target azimuth and elevation. In response to |Vego cos(β)+Vr| not satisfying the tolerance criterion, the machine instructions cause the at least one processor to determine whether the estimated target elevation is greater than or equal to $$\operatorname{atan}\left(\frac{-Hrad}{R}\right)$$

17 and less than or equal to $$atan\left(\frac{Hmax - Hrad}{R}\right),$$

where Hrad represents a height of the radar system in the environment and Hmax represents a maximum relevant object height.

In response to the estimated target elevation being greater than or equal to $$atan\left(\frac{-Hrad}{R}\right)$$

and less than or equal to $$atan\left(\frac{Hmax - Hrad}{R}\right),$$

the machine instructions cause the at least one processor to output a notification indicative of a valid moving-object estimated target azimuth and elevation. In response to the estimated target elevation not being greater than or equal to $$atan\left(\frac{-Hrad}{R}\right)$$

and less than or equal to $$atan\left(\frac{Hmax - Hrad}{R}\right),$$

the machine instructions cause the at least one processor to output the notification indicative of the invalid estimated target azimuth and elevation.

A method includes obtaining an ego velocity Vego of a radar system, a range R of an object in an environment of the radar system, and a radial velocity Vr of the object. A simplified two-dimensional (2D) angular search grid is determined, and a grid-based direction-of-arrival algorithm is performed using the simplified 2D angular search grid.

In some implementations, determining the simplified 2D angular search grid includes determining a ring of possible positions for a stationary object based on the ego velocity Vego, the range R, and the radial velocity Vr. The simplified 2D angular search grid includes the ring of possible positions. In some implementations, the method also includes performing an azimuth direction-of-arrival estimation algorithm to obtain an estimated azimuth for the object in the environment. Determining the simplified 2D angular search grid includes selecting a subset of relevant possible positions from the ring of possible positions having the estimated azimuth. The simplified 2D angular search grid includes the subset of relevant possible positions.

In some implementations, determining the simplified 2D angular search grid includes determining an arc of possible positions for a moving object based on the range R. The simplified 2D angular search grid includes the arc of possible positions. In some implementations, the method also includes performing an azimuth direction-of-arrival estimation algorithm to obtain an estimated azimuth for the object in the environment. Determining the simplified 2D angular search grid includes selecting a subset of relevant possible positions from the arc of possible positions having the estimated azimuth. The simplified 2D angular search grid includes the subset of relevant possible positions.

In some implementations, the arc of possible positions includes possible positions having an elevation corresponding to a ground level of the environment. In some implementations, the arc of possible positions includes possible positions having elevations within a range of relevant elevations selected based on a height of the radar system in the environment and a maximum relevant object height. In some implementations, the arc of possible positions includes possible positions having elevations greater than or equal to $$atan\left(\frac{-H_{radar}}{R}\right)$$

and less than or equal to $$atan\left(\frac{H_{max} - H_{radar}}{R}\right),$$

where Hradar represents the height of the radar system in the environment and Hmax represents the maximum relevant object height.

In some implementations, the method also includes obtaining an estimated target azimuth and an estimated target elevation for the object in the environment. Whether the estimated target azimuth is within a minimum and maximum azimuth field of view (FOV) of the radar system is determined. In response to the estimated target azimuth not being within the minimum and maximum azimuth FOV, a notification indicative of an invalid estimated target azimuth and elevation is output. In response to the estimated target azimuth being within the minimum and maximum azimuth FOV, whether the estimated target elevation is within a minimum and maximum elevation FOV of the radar system is determined.

In response to the estimated target elevation not being within the minimum and maximum elevation FOV the notification indicative of the invalid estimated target azimuth and elevation is output. In response to the estimated target elevation being within the minimum and maximum elevation FOV, whether |Vego cos(β)+Vr| satisfies a tolerance criterion is determined, where β represents an angle between the ego velocity Vego and the radial velocity Vr. In response to |Vego cos(β)+Vr| satisfying the tolerance criterion, a notification indicative of a valid stationary-object estimated target azimuth and elevation is output. In response to |Vego cos(β)+Vr| not satisfying the tolerance criterion, whether the estimated target elevation is greater than or equal to $$atan\left(\frac{-Hrad}{R}\right)$$

and less than or equal to $$atan\left(\frac{Hmax - Hrad}{R}\right)$$

19 is determined, where Hrad represents a height of the radar system in the environment and Hmax represents a maximum relevant object height.

In response to the estimated target elevation being greater than or equal to $$atan\left(\frac{-Hrad}{R}\right)$$

and less than or equal to $$atan\left(\frac{Hmax - Hrad}{R}\right),$$

a notification indicative of a valid moving-object estimated target azimuth and elevation is output. In response to the estimated target elevation not being greater than or equal to $$atan\left(\frac{-Hrad}{R}\right)$$

and less than or equal to $$atan\left(\frac{Hmax - Hrad}{R}\right),$$

the notification indicative of the invalid estimated target azimuth and elevation is output.

What is claimed is:

1. A radar system, comprising:

at least one processor; and at least one non-transitory computer-readable medium storing machine instructions which, when executed by the at least one processor, cause the at least one processor to:

obtain an ego velocity Vego of a radar system on a vehicle;

determine, based on processing of a radar signal received by one radar sensor circuit within the radar system, a range R value determination of an object in an environment of the radar system, and a radial velocity Vr value determination of the object;

determine a two-dimensional (2D) angular search grid based on the ego velocity Vego, the range R value determination, and the radial velocity Vr value determination, wherein the 2D angular search grid comprises an arc and a ring, wherein the arc indicates possible positions of a moving object based on the ego velocity Vego, the range R value determination, and the radial velocity Vr value determination, and the ring indicates possible positions of a stationary object based on the ego velocity Vego, the range R value determination and the radial velocity Vr value determination;

perform a grid-based direction-of-arrival algorithm using the 2D angular search grid to determine at least one of a motion state or a direction of arrival of the object relative to the vehicle; and perform, on the vehicle with an automated driving assistance system based on the at least one of the motion state or the directions of arrival of the object, at least one of braking, parking, or lane change assistance.

2. The radar system of claim 1, wherein the non-transitory computer-readable medium further stores machine instructions which, when executed by the at least one processor, cause the at least one processor to perform an azimuth direction-of-arrival estimation algorithm to obtain an estimated azimuth for the object in the environment, and wherein the machine instructions to determine the 2D angular search grid comprise machine instructions to select a subset of relevant possible positions from the ring of possible positions having the estimated azimuth, wherein the 2D angular search grid includes the subset of relevant possible positions.

3. The radar system of claim 1, wherein the machine instructions to determine the 2D angular search grid comprise machine instructions to determine an arc of possible positions for a moving object based on the range R, wherein the 2D angular search grid includes the arc of possible positions.

4. The radar system of claim 3, wherein the non-transitory computer-readable medium further stores machine instructions which, when executed by the at least one processor, cause the at least one processor to perform an azimuth direction-of-arrival estimation algorithm to obtain an estimated azimuth for the object in the environment, and wherein the machine instructions to determine the 2D angular search grid comprise machine instructions to select a subset of relevant possible positions from the arc of possible positions having the estimated azimuth, wherein the 2D angular search grid includes the subset of relevant possible positions.

5. The radar system of claim 3, wherein the arc of possible positions includes possible positions having an elevation corresponding to a ground level of the environment.

6. The radar system of claim 3, wherein the arc of possible positions includes possible positions having elevations within a range of relevant elevations selected based on a height of the radar system in the environment and a maximum relevant object height.

7. The radar system of claim 6, wherein the arc of possible positions includes possible positions having elevations greater than or equal to $$atan\left(\frac{-H_{radar}}{R}\right)$$

and less than or equal to $$atan\left(\frac{H_{max} - H_{radar}}{R}\right),$$

ein Hradar represents the height of the radar system in the environment and Hmax represents the maximum relevant object height.

8. The radar system of claim 1, wherein the non-transitory computer-readable medium further stores machine instructions which, when executed by the at least one processor, cause the at least one processor to:

obtain an estimated target azimuth and an estimated target elevation for the object in the environment;

determine whether the estimated target azimuth is within a minimum and maximum azimuth field of view (FOV) of the radar system;

in response to the estimated target azimuth not being within the minimum and maximum azimuth FOV, output a notification indicative of an invalid estimated target azimuth and elevation;

in response to the estimated target azimuth being within the minimum and maximum azimuth FOV, determine whether the estimated target elevation is within a minimum and maximum elevation FOV of the radar system;

in response to the estimated target elevation not being within the minimum and maximum elevation FOV, output the notification indicative of the invalid estimated target azimuth and elevation;

in response to the estimated target elevation being within the minimum and maximum elevation FOV, determine whether $|Vego\ cos(\beta)+Vr|$ satisfies a tolerance criterion, wherein $\beta$ represents an angle between the ego velocity Vego and the radial velocity Vr;

in response to $|Vego\ cos(\beta)+Vr|$ satisfying the tolerance criterion, output a notification indicative of a valid stationary-object estimated target azimuth and elevation;

in response to $|Vego\ cos(\beta)+Vr|$ not satisfying the tolerance criterion, determine whether the estimated target elevation is greater than or equal to $$a\tan\left(\frac{-Hrad}{R}\right)$$

and less than or equal to $$a\tan\left(\frac{Hmax - Hrad}{R}\right),$$

wherein Hrad represents a height of the radar system in the environment and Hmax represents a maximum relevant object height;

in response to the estimated target elevation being greater than or equal to $$a\tan\left(\frac{-Hrad}{R}\right)$$

and less than or equal to $$a\tan\left(\frac{Hmax - Hrad}{R}\right),$$

output a notification indicative of a valid moving-object estimated target azimuth and elevation; and in response to the estimated target elevation not being greater than or equal to $$a\tan\left(\frac{-Hrad}{R}\right)$$

and less than or equal to $$a\tan\left(\frac{Hmax - Hrad}{R}\right),$$

output the notification indicative of the invalid estimated target azimuth and elevation.

9. The radar system of claim 1, wherein the machine instructions to determine the 2D angular search grid determines the 2D angular search grid based on the ego velocity Vego, one range R value determination, and one radial velocity Vr value determination.

10. A non-transitory computer-readable medium storing machine instructions which, when executed by at least one processor, cause the at least one processor to:

obtain an ego velocity Vego of a radar system on a vehicle;

determine, based on processing of a radar signal received by one radar sensor circuit within the radar system, a range R value determination of an object in an environment of the radar system, and a radial velocity Vr value determination of the object;

determine a two-dimensional (2D) angular search grid based on the ego velocity Vego, the range R value determination, and the radial velocity Vr value determination, wherein the 2D angular search grid comprises an arc and a ring, wherein the arc indicates possible positions of a moving object based on the ego velocity Vego, the range R value determination, and the radial velocity Vr value determination, and the ring indicates possible positions of a stationary object based on the ego velocity Vego, the range R value determination and the radial velocity Vr value determination;

perform a grid-based direction-of-arrival algorithm using the 2D angular search grid to determine at least one of a motion state or a direction of arrival of the object relative to the vehicle; and perform, on the vehicle with an automated driving assistance system based on the at least one of the motion state or the directions of arrival of the object, at least one of braking, parking, or lane change assistance.

11. The non-transitory computer-readable medium of claim 10, further storing machine instructions which, when executed by the at least one processor, cause the at least one processor to perform an azimuth direction-of-arrival estimation algorithm to obtain an estimated azimuth for the object in the environment, wherein the machine instructions to determine the 2D angular search grid comprise machine instructions to select a subset of relevant possible positions from the ring of possible positions having the estimated azimuth, and wherein the 2D angular search grid includes the subset of relevant possible positions.

12. The non-transitory computer-readable medium of claim 10, wherein the machine instructions to determine the 2D angular search grid comprise machine instructions to determine an arc of possible positions for a moving object based on the range R, wherein the 2D angular search grid includes the arc of possible positions.

13. The non-transitory computer-readable medium of claim 12, further storing machine instructions which, when executed by the at least one processor, cause the at least one processor to perform an azimuth direction-of-arrival estimation algorithm to obtain an estimated azimuth for the object in the environment, wherein the machine instructions to determine the 2D angular search grid comprise machine instructions to select a subset of relevant possible positions from the arc of possible positions having the estimated azimuth, and wherein the 2D angular search grid includes the subset of relevant possible positions.

14. The non-transitory computer-readable medium of claim 10, further storing machine instructions which, when executed by the at least one processor, cause the at least one processor to:

obtain an estimated target azimuth and an estimated target elevation for the object in the environment;

determine whether the estimated target azimuth is within a minimum and maximum azimuth field of view (FOV) of the radar system;

in response to the estimated target azimuth not being within the minimum and maximum azimuth FOV, output a notification indicative of an invalid estimated target azimuth and elevation;

in response to the estimated target azimuth being within the minimum and maximum azimuth FOV, determine whether the estimated target elevation is within a minimum and maximum elevation FOV of the radar system;

in response to the estimated target elevation not being within the minimum and maximum elevation FOV, output the notification indicative of the invalid estimated target azimuth and elevation;

in response to the estimated target elevation being within the minimum and maximum elevation FOV, determine whether $|Vego \cos(\beta)+Vr|$ satisfies a tolerance criterion, wherein $\beta$ represents an angle between the ego velocity Vego and the radial velocity Vr;

in response to $|Vego \cos(\beta)+Vr|$ satisfying the tolerance criterion, output a notification indicative of a valid stationary-object estimated target azimuth and elevation;

in response to $|Vego \cos(\beta)+Vr|$ not satisfying the tolerance criterion, determine whether the estimated target elevation is greater than or equal to $$a\tan\left(\frac{-Hrad}{R}\right)$$

and less than or equal to $$a\tan\left(\frac{Hmax-Hrad}{R}\right),$$

wherein Hrad represents a height of the radar system in the environment and Hmax represents a maximum relevant object height;

in response to the estimated target elevation being greater than or equal to $$a\tan\left(\frac{-Hrad}{R}\right)$$

and less than or equal to $$a\tan\left(\frac{Hmax-Hrad}{R}\right),$$

output a notification indicative of a valid moving-object estimated target azimuth and elevation; and

in response to the estimated target elevation not being greater than or equal to $$a\tan\left(\frac{-Hrad}{R}\right)$$

and less than or equal to $$a\tan\left(\frac{Hmax-Hrad}{R}\right),$$

output the notification indicative of the invalid estimated target azimuth and elevation.

15. A method, comprising:

obtaining an ego velocity Vego of a radar system on a vehicle;

determining, based on processing of a radar signal received by one radar sensor circuit within the radar system, a range R value determination of an object in an environment of the radar system, and a radial velocity Vr value determination of the object;

determining a two-dimensional (2D) angular search grid based on the ego velocity Vego, the range R value determination, and the radial velocity Vr value determination, wherein the 2D angular search grid comprises an arc and a ring, wherein the arc indicates possible positions of a moving object based on the ego velocity Vego, the range R value determination, and the radial velocity Vr value determination, and the ring indicates possible positions of a stationary object based on the ego velocity Vego, the range R value determination and the radial velocity Vr value determination;

performing a grid-based direction-of-arrival algorithm using the 2D angular search grid to determine at least one of a motion state or a direction of arrival of the object relative to the vehicle; and perform, on the vehicle with an automated driving assistance system based on the at least one of the motion state or the directions of arrival of the object, at least one of braking, parking, or lane change assistance.

16. The method of claim 15, further comprising performing an azimuth direction-of-arrival estimation algorithm to obtain an estimated azimuth for the object in the environment, wherein determining the 2D angular search grid comprises selecting a subset of relevant possible positions from the ring of possible positions having the estimated azimuth, and wherein the 2D angular search grid includes the subset of relevant possible positions.

17. The method of claim 15, wherein determining the 2D angular search grid comprises determining an arc of possible positions for a moving object based on the range R, wherein the 2D angular search grid includes the arc of possible positions.

18. The method of claim 17, further comprising performing an azimuth direction-of-arrival estimation algorithm to obtain an estimated azimuth for the object in the environment, wherein determining the 2D angular search grid comprises selecting a subset of relevant possible positions from the arc of possible positions having the estimated azimuth, and wherein the 2D angular search grid includes the subset of relevant possible positions.

* * * * *